United States Patent
Stoodley

(10) Patent No.: US 7,287,244 B2
(45) Date of Patent: Oct. 23, 2007

(54) EFFICIENTLY RELEASING LOCKS WHEN AN EXCEPTION OCCURS

(75) Inventor: Mark Graham Stoodley, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/730,956

(22) Filed: Dec. 9, 2003

(65) Prior Publication Data

US 2004/0243792 A1 Dec. 2, 2004

(30) Foreign Application Priority Data

May 30, 2003 (CA) ................................ 2430763

(51) Int. Cl.
*G06F 9/44* (2006.01)
(52) U.S. Cl. .................. 717/127; 717/148; 717/154; 712/244
(58) Field of Classification Search ............. 717/127, 717/148, 151–161; 712/244
See application file for complete search history.

(56) References Cited

U.S. PATENT DOCUMENTS

| | | | |
|---|---|---|---|
| 5,901,308 A * | 5/1999 | Cohn et al. ............. | 712/244 |
| 6,003,129 A | 12/1999 | Song et al. | |
| 6,167,424 A * | 12/2000 | Bak et al. ............... | 718/100 |
| 6,173,772 B1 | 1/2001 | Vaynshteyn | |
| 6,308,318 B2 | 10/2001 | Krishnaswamy | |
| 6,349,322 B1 * | 2/2002 | Shaylor ................. | 718/107 |
| 6,411,983 B1 | 6/2002 | Gallop | |
| 6,412,109 B1 | 6/2002 | Ghosh | |
| 6,425,039 B2 * | 7/2002 | Yoshioka et al. ...... | 710/269 |
| 6,487,716 B1 | 11/2002 | Choi et al. | |
| 6,799,315 B2 * | 9/2004 | Waki et al. ............. | 717/148 |
| 2001/0034753 A1 | 10/2001 | Hildebrand et al. | |
| 2002/0059568 A1 | 5/2002 | Kawahito et al. | |
| 2002/0112227 A1 | 8/2002 | Kramskoy et al. | |
| 2002/0169999 A1 | 11/2002 | Bhansali et al. | |
| 2002/0198919 A1 | 12/2002 | Kelkar | |
| 2003/0079202 A1 * | 4/2003 | Sokolov ................. | 717/118 |
| 2003/0079203 A1 * | 4/2003 | Sokolov ................. | 717/118 |
| 2003/0126187 A1 * | 7/2003 | Won et al. ............... | 709/107 |

* cited by examiner

*Primary Examiner*—Meng-Al T. An
*Assistant Examiner*—Michael Yaary
(74) *Attorney, Agent, or Firm*—Duke W. Yee; Marilyn Smith Dawkins; Theodore D. Fay, III

(57) ABSTRACT

In preparing inlined program code for compiling, a synchronization depth is recorded in a table for ranges of program counter addresses. Furthermore, a stack frame is dedicated for the recordation of references to objects locked during the execution of the code. Such references are recorded in the stack frame at a location based on synchronization depth. When an exception occurs, the synchronization depth may be determined from the table and used to obtain, from the stack frame, a reference to an object from which a lock should be removed.

15 Claims, 7 Drawing Sheets

```
101  class example {
102    public synchronized int inner_foo(int x, int y) {
103      return x/y;
104    }
105    public synchronized int foo(int x, int y) {
106      return inner_foo(x,y) + x;
107    }
108    public synchronized int bar(int x, int y) {
109      return x/y;
110    }
111    public void go_to_it (String[] args) {
112      int sum=0;
113      for (int i=0;i < 1000;i++) {
114        try {
115          sum += foo(i, args.length-1);
116          sum /= args.length-2;
117          sum += bar(i, args.length-3);
118        } catch (Exception e) {
119          System.out.println("caught exception\n");
120        }
121      }
122      System.out.println(sum);
123    }
124    public static void main(String[] args) {
125      example e=new e();
126      e.go_to_it(args);
127    }
128  }
```

FIG. 1

```
201  public void go_to_it (String[] args) {
202      int sum=0;
203      for (int i=0;i < 1000;i++) {
204          try {
205              synchronized(this) {
206                  int result;
207                  synchronized(this) {
208                      result = i/(args.length-1);
209                  }
210                  sum += result+i;
211              }
212              sum /= args.length-2;
213              synchronized(this) {
214                  sum += i/(args.length-3);
215              }
216          } catch (Exception e) {
217              System.out.println("caught exception\n");
218          }
219      }
220      System.out.println(sum);
221  }
```

FIG. 2

```
301 public void go_to_it (String[] args) {                    ⎲ 300
302     int sum=0;
303     for (int i=0;i < 1000;i++) {
304         try {
305             MONITORENTER(this)
306             try {
307                 int result;
308                 MONITORENTER(this)
309                 try {
310                     result = i/(args.length-1);
311                     MONITOREXIT(this)
312                 }
313                 catch (Exception e) {
314                     MONITOREXIT(this)
315                     throw e;
316                 }
317                 sum += result+i;
318                 MONITOREXIT(this)
319             }
320             catch (Exception e) {
321                 MONITOREXIT(this)
322                 throw e;
323             }
324             sum /= args.length-2;
325             MONITORENTER(this)
326             try {
327                 sum += i/(args.length-3);
328                 MONITOREXIT(this)
329             }
330             catch (Exception e) {
331                 MONITOREXIT(this)
332                 throw e;
333             }
334         }
335         catch (Exception e) {
336             System.out.println("caught exception\n");
337         }
338     }
339     System.out.println(sum);
340 }
```

FIG. 3

| 201-205 | — |
| 206-207 | 0 |
| 208-209 | 1 |
| 210-211 | 0 |
| 212-213 | — |
| 214-215 | 0 |
| 216-221 | — |

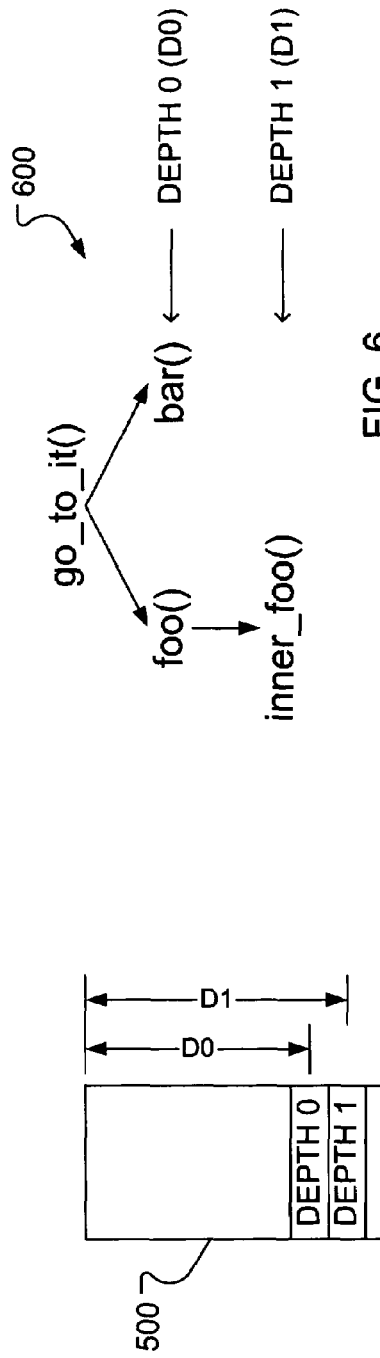
FIG. 5
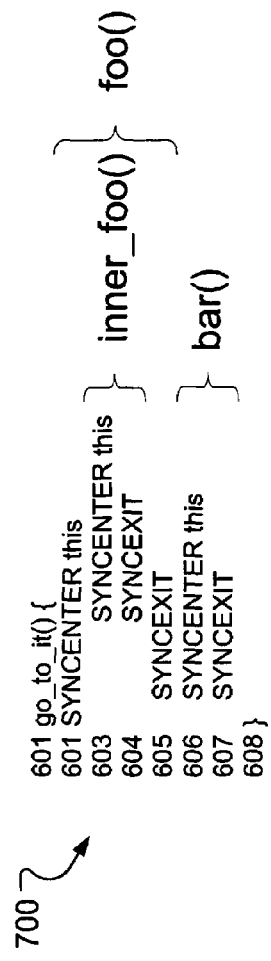
FIG. 6
```
700
    601 go_to_it() {
    601 SYNCENTER this
    603         SYNCENTER this
    604         SYNCEXIT
    605     SYNCEXIT
    606     SYNCENTER this
    607     SYNCEXIT
    608 }
```
FIG. 7

EFFICIENTLY RELEASING LOCKS WHEN AN EXCEPTION OCCURS

FIELD OF THE INVENTION

The present invention relates to compilers for programming languages and, in particular, to compiling programming code such that locks are efficiently released when an exception occurs during execution of the code.

BACKGROUND OF THE INVENTION

The Java programming language is recognized to provide many benefits to the programmer. Not the least of these benefits relate to the handling of error conditions, support for multiple threads (to be defined hereinafter) and platform independence.

A defined unit of programming code, developed for a particular purpose, has been called a function, a subroutine and a procedure in different programming languages. In the Java programming language, such a unit is called a "method".

Java includes provisions for handling unusual error conditions. The provisions are included in the form of "exceptions", which allow unusual error conditions to be handled without including "if" statements to deal with every possible error condition.

Java also includes provisions for multiple executions streams running in parallel. Such executions streams are called "threads".

One of the desirable qualities of Java, is the ability of Java code to be executed on a wide range of computing platforms, where each of the computing platforms in the range can run a Java Virtual Machine. However, there remains a requirement that the code run on a particular platform be native to that platform. A just-in-time (JIT) Java compiler is typically in place, as part of an environment in which Java code is to be executed, to convert Java byte code into native code for the platform on which the code is to be executed.

Recent JIT compilers have improved features, such as "method inlining" and "synchronization".

Where a method is called that does something trivial, like add one to an argument and then return the argument, Java programmers have, in the past, been tempted to simply insert the instruction rather than call the method. This act is called manual method inlining. Such manual method inlining can improve the speed at which the code runs as the overhead of an instruction that jumps to the called method, as well as the return from the method, is saved. Some JIT compilers have the capability to recognize where method inlining will improve the speed at which code runs and, thus, can automatically inline methods while converting the byte code into native code.

From Venners, Bill, "How the Java virtual machine performs thread synchronization", http://www.javaworld.com/javaworld/jw-07-1997/jw-07-hood.html, in the Java virtual machine (JVM), each thread is awarded a Java stack, which contains data no other thread can access. If multiple threads need to use the same objects or class variables concurrently, the access of the threads to the data must be properly managed. Otherwise, the program will have unpredictable behavior.

To coordinate shared data access among multiple threads, the Java virtual machine associates a lock with each object. A thread needing to lock a particular object, communicates this requirement to the JVM. The JVM may then provide the lock to the thread. When the thread no longer requires the lock, the thread communicates this lack of requirement to the JVM. If a second thread has requested the same lock, the JVM provides the lock to the second thread.

A single thread is allowed to lock the same object multiple times. For each object, the JVM maintains a count of the number of times the object has been locked. An unlocked object has a count of zero. When a thread acquires the lock for the first time, the count is incremented to one. Each time the thread acquires a lock on the same object, the count is incremented. Each time the thread releases the lock, the count is decremented. When the count reaches zero, the lock is released and made available to other threads.

In Java language terminology, the coordination of multiple threads that must access shared data is called synchronization. The Java language provides two built-in ways to synchronize access to data: with synchronized statements or synchronized methods.

Two bytecodes, namely "monitorenter" and "monitorexit", are used for synchronization blocks within methods. When the monitorenter bytecode is encountered by the Java virtual machine, the Java virtual machine acquires the lock for the object referred to by object ref on the stack. If the thread already owns the lock for that object, a count is incremented. Each time the monitorexit bytecode is executed for the thread on the object, the count is decremented. When the count reaches zero, the lock is released.

When an exception occurs in an executing Java method, any locks on the objects with which the method has been interacting must be released. As will be apparent to a person skilled in the art, the locks that must be released do not include the locks that are held at entry to the handler's try region. In a known JIT compiler, monitorenter and monitorexit locking operations use a "try region" and a handler to guarantee that an object is unlocked even if an exception occurs. Such a handler effectively catches and re-throws exceptions to guarantee that each locked object is unlocked. Such an approach may be considered costly in terms of execution time required to throw and handle multiple exceptions.

SUMMARY OF THE INVENTION

In compiling the program code for a method, synchronization depths are recorded in a table for various ranges of program counter addresses in the method. A portion of a stack frame associated with the method may be dedicated for the recordation of references to objects locked during the execution of the compiled method code. Such references are recorded in the stack frame at a location based on synchronization depth. When an exception occurs, the synchronization depth may be determined from the table and used to obtain a reference to an object from which a lock should be removed. Advantageously, the costly practice of catching and re-throwing exceptions is avoided and, thus, execution time may be shortened.

In accordance with an aspect of the present invention there is provided a method of handling an exception. The method includes recognizing that an exception has occurred during the execution of a given method, consulting a stack frame associated with the given method to determine an identity of an object required to be unlocked and removing the lock on the object. In other aspects of the present invention, an exception handler is provided for performing this method and a computer readable medium is provided to allow a general purpose computer to perform this method.

In accordance with another aspect of the present invention there is provided, at a just in time compiler of programming language code, the programming language code including a plurality of instructions, a method of generating executable code. The method includes determining a synchronization depth for each instruction, associating the synchronization depth with a program counter address associated with each instruction, determining a continuous range of program counter addresses associated with an equivalent synchronization depth and storing an indication of the continuous range of program counter addresses in a table associated with the equivalent synchronization depth. In other aspects of the present invention, a just in time compiler is provided for performing this method and a computer readable medium is provided to allow a general purpose computer to perform this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 1 illustrates an exemplary code fragment for use in describing the operation of the present invention;

FIG. 2 illustrates a method of the exemplary code of FIG. 1, wherein several methods have been inlined;

FIG. 3 illustrates a compiled code listing corresponding to the inlining version of the code of FIG. 1 as output from a typical JIT compiler;

FIG. 4 illustrates a synchronization depth table for the method illustrated in FIG. 2, constructed according to an aspect of the present invention;

FIG. 5 illustrates a stack frame related to the method illustrated in FIG. 2;

FIG. 6 illustrates an inlining tree related to the method illustrated in FIG. 2;

FIG. 7 illustrates a simplified version of the code of the method of FIG. 2, only showing synchronization operations;

DETAILED DESCRIPTION

Figure 8:
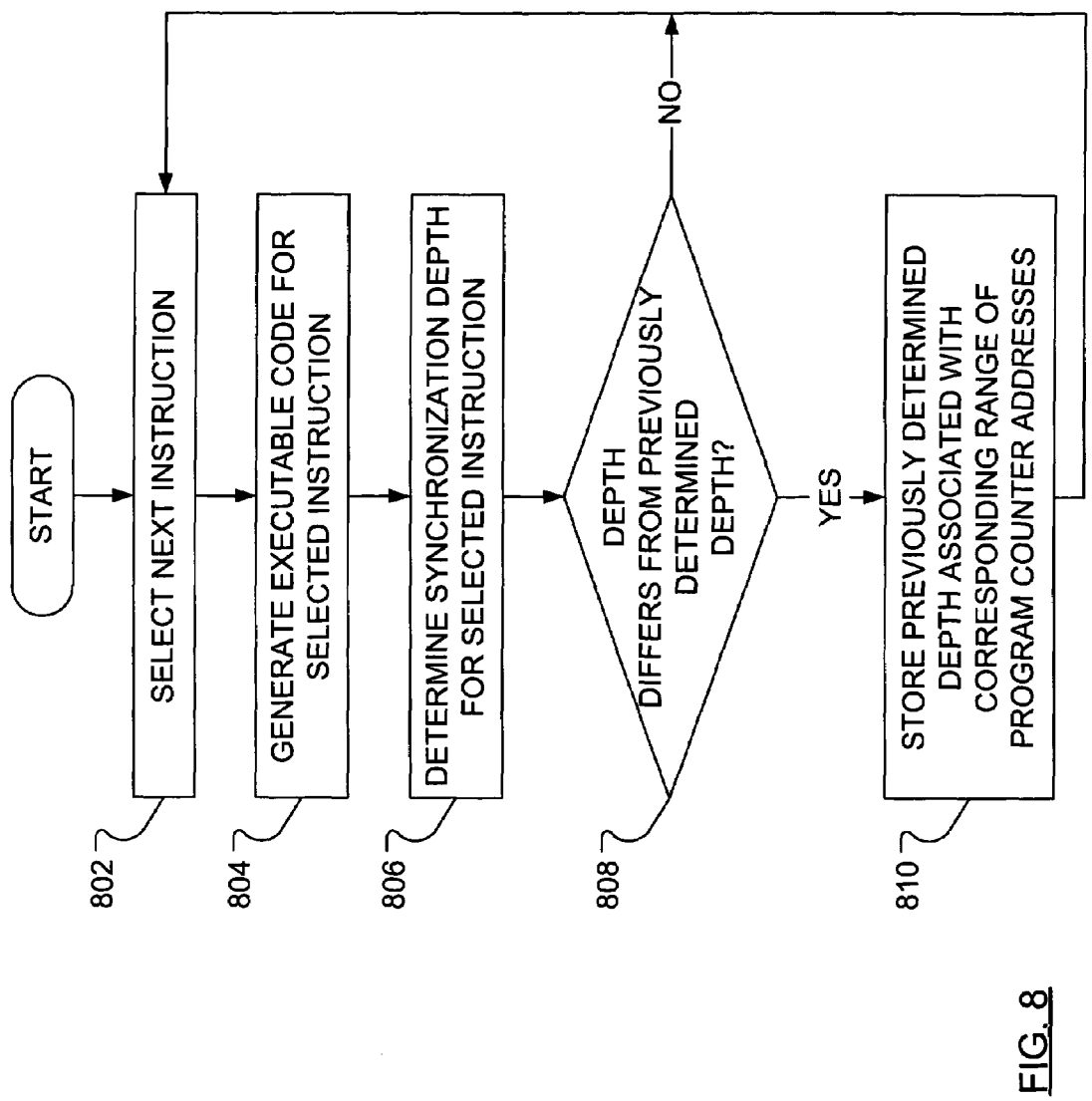
FIG. 8 illustrates steps in program code compiling method according to an aspect of the present invention.

An exemplary code fragment 100 in FIG. 1 has five methods, including inner_foo( ) on lines 102-104, foo( ) on lines 105-107, bar( ) on lines 108-110, go_to_it( ) on lines 111-123 and main( ) on lines 124-127. Since the go_to_it( ) method calls the foo( ), inner_foo( ) and bar( ) methods in a try block defined over lines 114-118, a JIT compiler may recognize that the called methods may be inlined into the go_to_it( ) method. Such inlining creates two synchronized regions in the try block, as shown in an inlining version 200 of the go_to_it( ) method illustrated in FIG. 2.

In the inlining version of the go_to_it( ) method 200, lines 207-209 may be recognized as the inlined inner_foo( ) method, lines 207-209 may be recognized as the inlined foo( ) method and lines 213-215 may be recognized as the inlined bar( ) method. If the code on one of the lines 207-209 causes an exception, then a receiver object must be unlocked twice before the catch block (lines 216-218) may be executed. Similarly, if the code on lines 213-215 causes an exception, then the receiver object must be unlocked once before the catch block (lines 216-218) may be executed.

A javac compiler (a known Java compiler) compiling the inlining version of go_to_it( ) 200, which is directly written in Java using the synchronized statement, would insert an artificial try region around each synchronized code region (lines 207-209 and lines 213-215). Such an artificial try region has a catch block that unlocks the object before re-throwing the exception. The synchronization would typically be implemented using the Java bytecodes monitorenter and monitorexit. FIG. 3 illustrates a compiled code listing 300 corresponding to the inlining version of go_to_it( ) 200 as output from a typical JIT compiler. The artificial try regions and monitorenter and monitorexit bytecodes should be evident in the compiled code listing 300.

In contrast, where the inlining version of the go_to_it( ) method 200 is compiled by a JIT compiler employing aspects of the present invention to inline the foo( ) and bar( ) methods, no artificial try regions are inserted and the synchronized regions may be implemented using artificial, herein-proposed "syncenter" and "syncexit" bytecodes.

The introduction of these artificial bytecodes has two main benefits. First, unlike the more general monitorenter and monitorexit bytecodes, syncenter and syncexit bytecodes are guaranteed to be hierarchically nested because they result from the invocation inlining tree. It is not possible, in Java, to execute the sequence: call foo( ), call inner_foo( ), return from foo( ), return from inner_foo( ). The syncenter/syncexit bytecodes for the foo( ) method must therefore execute around the syncenter/syncexit bytecodes for the inner_foo( ) method. That is, the artificial bytecodes may not be interleaved. The second main benefit is that, since these artificial bytecodes cannot occur in known Java class files, the JIT compiler recognizes that every syncexit bytecode must be balanced by an earlier syncenter bytecode. Only through an exception that is not handled in the method could a syncexit execute without the corresponding syncenter having executed earlier. Additionally, only through an exception that is not handled in the method could a syncenter acquire a lock that will not be later released by a corresponding syncexit. However, these exceptional cases may be correctly handled by a Java Virtual Machine (the environment in which such code is executed) that is aware of the syncenter and syncexit bytecodes.

These two benefits permit a much more efficient mechanism so that, when an exception occurs, all objects that are locked within the try block are properly unlocked. The first benefit (the guarantee of hierarchical nesting) allows the JIT compiler to dedicate contiguous and small sets of storage locations in the stack frame and to store, in each set, references to objects that have been locked within the method via the syncenter bytecode. In the Java Virtual Machine, as each syncenter bytecode executes, a reference to the object that is being locked is placed into one specific storage location in the stack frame. The storage location is determined by the depth of the syncenter bytecode in a tree of inlined invocations for this method.

FIG. 4 illustrates a synchronization depth table 400 for the inlined go_to_it( ) method 200 illustrated in FIG. 2. The synchronization depth table 400 is used to associate a synchronization depth with ranges of program counter addresses. FIG. 5 illustrates a stack frame 500 associated with the inlined go_to_it( ) method 200. A corresponding inlining tree 600, also associated with the inlined go_to_it( ) method 200, is illustrated in FIG. 6. FIG. 7 illustrates simplified code 700 for the inlined go_to_it( ) method 200, showing only the synchronization operations.

The herein proposed JIT compiler initially performs a single pass over the code of a method to compute a synchronization depth at the beginning of each basic block of code. These basic block synchronization depths are then used by the JIT compiler during code generation to determine the ranges of program counter addresses in the method that have the same synchronization depth. These ranges are stored in the synchronization depth table 400 illustrated in FIG. 4, which may be efficiently searched to determine the synchronization depth at any particular program counter address when an exception occurs.

In operation, described in conjunction with a compiler flow diagram illustrated in FIG. 8, the JIT compiler considers each instruction (step 802) of each block of a method and generates executable code (step 804) corresponding to each instruction. While doing so, the JIT compiler maintains an indication of the current synchronization depth. Where the synchronization depth determined (step 806) for the current instruction is determined (step 808) to differ from the synchronization depth determined for the directly preceding instruction, the synchronization depth determined for the directly preceding instruction is stored in the synchronization depth table 400 associated with a range of program counter addresses that share the same synchronization depth (step 810). The range includes the program counter address of the directly preceding instruction.

The basic blocks of the method code are not necessarily considered in order. That is, a current basic block of code under consideration may not be the direct successor to the previous basic block of code considered by the JIT compiler. As such, information collected in the hereinbefore discussed pass over the code to compute a synchronization depth at the beginning of each basic block of code is used to properly set the maintained indication of synchronization depth as the JIT compiler begins to consider a particular basic block of code.

In the illustrated example, such determining for the inlined go_to_it( ) method 200 results in the synchronization depth table 400 illustrated in FIG. 4. Notably, the synchronization depth table 400 associates ranges of program counter addresses in the method with a particular synchronization depth. Clearly, it may be desirable to conserve memory by not storing the ranges for which no synchronization depth exists. As the table stores the ranges of program counter addresses sequentially, it will be understood by a program accessing the synchronization depth table 400 that, if a given program counter address is not found, no synchronization depth exists for the given program counter address.

It may be seen that, in the simplified code 700 (FIG. 7), the foo( ) method is the topmost inlined synchronized method in the go_to_it( ) method 200. As such, when executed, the syncenter bytecode for the foo( ) method (line 702) causes a reference to an object required to be locked to be stored at the "depth 0" location in the stack frame 500 (see FIG. 5) associated with the inlined go_to_it( ) method 200. Similarly, execution of the syncenter bytecode for the inner_foo( ) method (line 703) causes a reference to an object required to be locked to be stored at the "depth 1" location. Execution of the syncexit bytecode for the inner_foo( ) method (line 704) causes the reference to the object at the "depth 1" location to be read and the referenced object is then unlocked. When the syncexit bytecode for the foo( ) method (line 705) executes, the reference to the locked object at the "depth 0" location is read and the referenced object is then unlocked. Subsequently, execution of the syncenter bytecode for the bar) method (line 706) causes a reference to an object required to be locked to be stored at the "depth 0" location. When the syncexit bytecode for the bar( ) method (line 707) executes, the reference to the object at the "depth 0" location is read and the referenced object is then unlocked.

From the foregoing, it will be appreciated that the synchronization depth table 400 of FIG. 4 is created as the code is compiled and that the compiled code causes storing of object references to, and the reading of object references from, the stack frame 500 of FIG. 5 while the compiled code executes.

Figure 9:
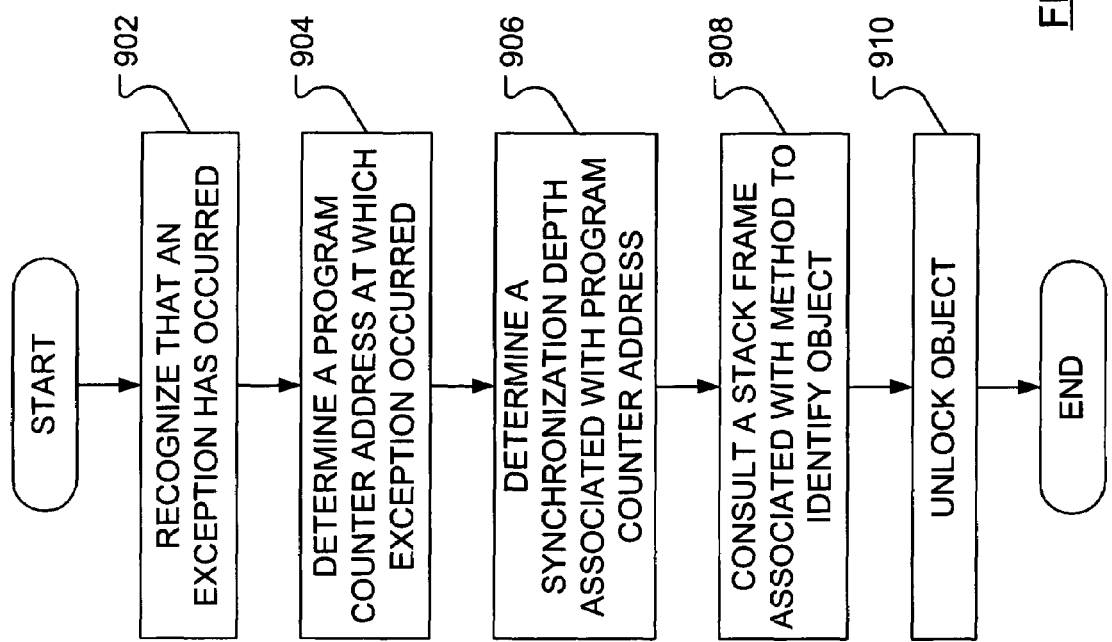
FIG. 9 illustrates steps in an error handling method according to an aspect of the present invention.

In view of FIG. 9, exception handling begins when an exception handler recognizes that a exception has been thrown (step 902), say during the execution of the inlined go_to_it( ) method 200. Responsive to such a recognition, the exception handler determines a program counter address at which the exception occurred (step 904). The synchronization depth table 400 (FIG. 4) is then consulted to determine, given the program counter address at which the exception occurred, the synchronization depth (step 906). For instance, should an exception be thrown during the execution of line 214 of the inlined go_to_it( ) method 200, the range 214-215 of the synchronization depth table 400 is consulted to determine that the synchronization depth is depth 0. The handler may then use the synchronization depth to read the appropriate reference to an object to be unlocked (step 908). The reading is performed, in this example, from the stack frame 500 associated with the inlined go_to_it( ) method 200. The reference to the locked object may then be obtained from the location in the stack frame 500 that is associated with depth 0. Once the reference to the object is obtained, the object may then be unlocked (step 910).

Inherently, a given exception handler is aware of the number of locks to be removed when an exception causes the given exception handler to be called. That is, the given exception handler is prearranged to be called at a preset synchronization depth. By consulting the synchronization depth table 400, the given exception handler determines the current synchronization depth. The difference between the current synchronization depth and the preset synchronization depth provides an indication to the given exception handler of the number of objects that are to be unlocked before the given exception handler can execute normally.

Without such a technique, many more handlers and many more exceptions may be required to unlock the correct number of objects when an exception occurs. If an exception occurs at line 310 in the typical compiled code listing 300 (FIG. 3), then two additional handlers must execute to unlock the appropriate objects (i.e., three exceptions are thrown and handled). In a version of the corresponding inlined go_to_it( ) method 200 illustrated in FIG. 2 compiled according to herein presented methods, if the exception happens at the same place (line 208) then only one exception is thrown and handled.

Moreover, known JIT compilers cannot optimize the Java code as well as the herein proposed JIT compiler in the presence of the extra try regions required to unlock each object. Aspects of the present invention allow the herein proposed JIT compiler to generate better code while accelerating exception handling.

Advantageously, aspects of the present invention allow the number of objects that must be unlocked when an exception occurs to be efficiently determined by a single, fast lookup in a table of program counter address ranges for the current method.

Other modifications will be apparent to those skilled in the art and, therefore, the invention is defined in the claims.

I claim:

1. A method of handling an exception, the method comprising:
    recognizing that the exception has occurred during execution of a given method;
    consulting a stack frame associated with the given method to determine an identity of an object to be unlocked;
    removing a lock on the object; and
    wherein the method of handling an exception further includes:
    determining a program counter address at which the exception has occurred;
    determining, from a table, a synchronization depth associated with each instruction of a plurality of instructions associated with the program counter address;
    determining a continuous range of program counter addresses associated with an equivalent synchronization depth and wherein an indication of the continuous range of program counter addresses is stored in the table; and
    wherein consulting the stack frame includes reading from a location associated with the synchronization depth.

2. A computer storage medium containing computer-executable instructions which, when performed by a processor in a computing system, cause the computer system to:
    recognize that the exception has occurred during execution of a given method;
    consult a stack frame associated with the given method to determine an identity of an object to be unlocked;
    remove a lock on the object;
    determine a program counter address at which the exception has occurred;
    determine, from a table, a synchronization depth associated with each instruction of a plurality of instructions associated with the program counter address;
    determine a continuous range of program counter addresses associated with an equivalent synchronization depth and wherein an indication of the continuous range of program counter addresses is stored in the table; and
    wherein consulting the stack frame includes reading from a location associated with the synchronization depth.

3. The method of claim 1 wherein a just in time compiler of Java programming language code is used to perform the method of handling an exception.

4. The method of claim 1 wherein a first synchronization depth determined for a first instruction differs from a second synchronization depth determined for a directly preceding instruction, wherein determining the continuous range of program counter addresses comprises, storing the second synchronization depth in the table, wherein the table is associated with a given range of program counter addresses, and wherein the given range of program counter addresses includes a program counter address of a directly preceding instruction.

5. The method of claim 1, wherein the plurality of instructions may be arranged in a plurality of basic blocks of code, and wherein the method further comprises:
    determining a synchronization depth at a beginning of each basic block of code in the plurality of basic blocks of code.

6. The method of claim 1, wherein consulting the stack frame comprises consulting only the stack frame.

7. The method of claim 1, wherein a just in time compiler dedicates a storage location in the stack frame and stores, in the storage location, a reference to the object, and wherein consulting the stack frame comprises consulting the storage location for the reference.

8. The method of claim 1, further comprising:
    responsive to executing a syncenter bytecode in a JAVA virtual machine, placing a reference to the object into the stack frame.

9. The method of claim 1, further comprising:
    determining a storage location of the reference in the stack frame according to a depth of the syncenter bytecode in a tree of inlined invocations for the given method.

10. The method of claim 1, further comprising:
    releasing the lock by executing a syncexit bytecode in the JAVA virtual machine.

11. The computer storage medium of claim 2, wherein consulting the stack frame comprises consulting only the stack frame.

12. The computer storage medium of claim 2, wherein a just in time compiler dedicates a storage location in the stack frame and stores, in the storage location, a reference to the object, and wherein consulting the stack frame comprises consulting the storage location for the reference.

13. The computer storage medium of claim 2 wherein the computer-executable instructions, when performed by a processor in a computer system, further cause the computer system to:
    responsive to executing a syncenter bytecode in a JAVA virtual machine, place a reference to the object into the stack frame.

14. The computer storage medium of claim 2 wherein the computer-executable instructions, when performed by a processor in a computer system, further cause the computer system to:
    determine a storage location of the reference in the stack frame according to a depth of the syncenter bytecode in a tree of inlined invocations for the given method.

15. The computer storage medium of claim 2 wherein the computer-executable instructions, when performed by a processor in a computer system, further cause the computer system to:
    release the lock by executing a syncexit bytecode in the JAVA virtual machine.

* * * * *